US008554687B2

(12) United States Patent
Malackowski et al.

(10) Patent No.: US 8,554,687 B2
(45) Date of Patent: *Oct. 8, 2013

(54) INTELLECTUAL PROPERTY TRADING EXCHANGE AND A METHOD FOR TRADING INTELLECTUAL PROPERTY RIGHTS

(75) Inventors: James E. Malackowski, Chicago, IL (US); Michael J. Lasinski, Chicago, IL (US)

(73) Assignee: IPXI Technologies, LLC, Chicago, IL (US)

( * ) Notice: Subject to any disclaimer, the term of this patent is extended or adjusted under 35 U.S.C. 154(b) by 46 days.

This patent is subject to a terminal disclaimer.

(21) Appl. No.: 12/953,814

(22) Filed: Nov. 24, 2010

(65) Prior Publication Data
US 2011/0071961 A1    Mar. 24, 2011

Related U.S. Application Data

(63) Continuation of application No. 11/405,166, filed on Apr. 17, 2006, now Pat. No. 7,885,897.

(60) Provisional application No. 60/672,324, filed on Apr. 18, 2005.

(51) Int. Cl.
*G06F 21/00* (2006.01)

(52) U.S. Cl.
USPC .................... 705/59; 705/51; 705/57; 705/64

(58) Field of Classification Search
USPC ........................................ 705/51, 57, 59, 64
See application file for complete search history.

(56) References Cited

U.S. PATENT DOCUMENTS

| 5,671,412 | A | 9/1997 | Christiano |
| 6,556,992 | B1 | 4/2003 | Barney et al. |
| 6,885,999 | B1 * | 4/2005 | Corless ............................ 705/59 |
| 6,959,280 | B1 | 10/2005 | Risen et al. |
| 6,973,444 | B1 * | 12/2005 | Blinn et al. ...................... 705/51 |
| 7,031,943 | B1 * | 4/2006 | James et al. ..................... 705/59 |
| 7,043,454 | B2 * | 5/2006 | Powell ............................. 705/59 |
| 7,082,399 | B2 * | 7/2006 | Utsumi ............................ 705/53 |
| 7,127,405 | B1 * | 10/2006 | Frank et al. ..................... 705/310 |

(Continued)

FOREIGN PATENT DOCUMENTS

| DE | 10257159 A1 | 6/2004 |
| JP | 2007035077 A | 2/2007 |

OTHER PUBLICATIONS

Non-Final Office Action in U.S. Appl. No. 12/355,530, dated Sep. 9, 2010, 11 pages.
PCT International Search Report, dated Dec. 2, 2009, 2 pages.

(Continued)

*Primary Examiner* — Arthur O. Hall

(57) ABSTRACT

An intellectual property trading exchange is disclosed for facilitating the trading of intellectual property rights. The exchange includes at least one intellectual property license contract relating to intellectual property rights and a forum configured to allow a plurality of participants to trade the license contract. The plurality of participants includes at least one seller, which may be the owner, having the license contract and desiring to trade the license contract. The plurality of participants also includes at least one buyer desiring to obtain the license contract. The buyer may be an investor, speculator, market maker, or arbitrageur, who purchases the license contract to achieve appreciation. The buyer also may be a licensee, who purchases the license contract to practice the intellectual property rights.

27 Claims, 2 Drawing Sheets

(56) References Cited

U.S. PATENT DOCUMENTS

| | | | |
|---|---|---|---|
| 7,136,838 B1* | 11/2006 | Peinado et al. | 705/59 |
| 7,260,557 B2* | 8/2007 | Chavez | 705/59 |
| 7,272,572 B1* | 9/2007 | Pienkos | 705/26.1 |
| 7,277,904 B2* | 10/2007 | Baird | 1/1 |
| 7,333,945 B1* | 2/2008 | Alling | 705/26.4 |
| 7,386,460 B1* | 6/2008 | Frank et al. | 705/310 |
| 7,386,891 B2* | 6/2008 | Peinado | 726/26 |
| 7,421,412 B2* | 9/2008 | Ramanathan | 705/59 |
| 7,716,076 B1 | 5/2010 | Block et al. | |
| 7,792,728 B2 | 9/2010 | Poltorak | |
| 2001/0034695 A1 | 10/2001 | Wilkinson | |
| 2002/0002523 A1 | 1/2002 | Kossovsky et al. | |
| 2002/0004775 A1 | 1/2002 | Kossovsky et al. | |
| 2002/0007335 A1 | 1/2002 | Millard et al. | |
| 2002/0077835 A1 | 6/2002 | Hagelin | |
| 2002/0107809 A1* | 8/2002 | Biddle et al. | 705/59 |
| 2002/0169625 A1* | 11/2002 | Yang et al. | 705/1 |
| 2003/0046238 A1* | 3/2003 | Nonaka et al. | 705/51 |
| 2004/0059678 A1 | 3/2004 | Stefik et al. | |
| 2004/0220867 A1 | 11/2004 | Messick et al. | |
| 2005/0197857 A1 | 9/2005 | Avery | |
| 2006/0100948 A1 | 5/2006 | Millien et al. | |
| 2007/0185817 A1 | 8/2007 | Davis | |
| 2008/0140557 A1 | 6/2008 | Bowlby et al. | |
| 2008/0243641 A1 | 10/2008 | Leno | |
| 2008/0243642 A1 | 10/2008 | Ramer | |
| 2009/0069913 A1 | 3/2009 | Stefik | |
| 2009/0070150 A1 | 3/2009 | Malackowski et al. | |
| 2010/0262530 A1 | 10/2010 | Malackowski et al. | |

OTHER PUBLICATIONS

Perrit, Henry H., "Knowbots, Permissions Headers and Contract Law", Apr. 30, 1993, http://archive.ifla.org/documents/infopol/copyright/perh2.txt, retrieved online May 4, 2011, 31 pages.

Wikipedia—Regression Analysis. http://en/wikipedia.org/wiki/Regression_analysis. Retrieved online Jul. 29, 2011.

"Intellectual Property Infringement Abatement Cost Reimbursement Insurance Policy", (1991-2009) Intellectual Property Insurance Services Corporation, 19 pages.

"Multi-Peril Intellectual Property Reimbursement Insurance Policy", (1992-2008) Intellectual Property Insurance Services Corporation, Inc., 23 pages.

"Multi-Peril Insurance Program Summary", (2010) IPISC Intellectual Property Insurance Services Corporation, 7 pages.

PCT International Search Report PCT/US09/38883; dated Dec. 2, 2009.

PCT International Preliminary Report on Patentability for PCT/US09/38883; dated Jul. 19, 2011.

PCT International Search Report for PCT/US11/59162; dated Feb. 13, 2012.

* cited by examiner

INTELLECTUAL PROPERTY TRADING EXCHANGE AND A METHOD FOR TRADING INTELLECTUAL PROPERTY RIGHTS

CROSS-REFERENCE TO RELATED APPLICATIONS

This application is a continuation of U.S. patent application Ser. No. 11/405,166, filed Apr. 17, 2006, which claims priority from U.S. Provisional Patent Application No. 60/672,324, filed Apr. 18, 2005, both of which are incorporated herein by reference in their entirety.

BACKGROUND OF THE INVENTION

The present invention relates to a trading exchange and, more particularly, to an exchange and method for trading intellectual property ("IP") rights, including rights in patents, copyrights, trademarks, trade dress, and trade secrets.

The market for IP rights has never been stronger. In 2005, for example, royalties from the licensing of IP rights accounted for more than $100 billion in revenues. Both sellers (or licensors) and buyers (or licensees) of IP rights have had the potential to make substantial gains in recent years because of an increased licensing demand.

Currently, there is no centralized marketplace for carrying out the licensing of IP rights. Rather, an IP owner desiring licensing capital must solicit bids from potential licensees and negotiate a licensing agreement. The transaction is similar to the licensing or sale of any other significant property or asset and may take weeks, months, or even years before any deal closes.

A drawback of the current IP licensing market is that IP owners must actively pursue parties for licensing. This process may be both time consuming and expensive, because IP owners usually are not fully aware of the entire market outside of their competitors and often must dedicate time and money to research the marketplace. Often, IP owners engage in expensive licensing campaigns to determine which parties might benefit from an IP license and then solicit those parties for interest. It is not unusual for licensing campaigns to extend a period of years for identifying and targeting all potential licensees.

Another drawback of the current IP licensing market is determining a value for the IP. After a potential licensee is identified, the IP owner and potential licensee must negotiate a royalty or fixed price for the IP rights. While valuation may be fairly settled in established industries, arriving at a reasonable value for IP related to new or emerging technologies may not be easily accomplished. In any technology, the valuation process may require weeks or even months of negotiating before any licensing agreement is signed. Some valuation methods have expedited this process, such as the methods disclosed by U.S. Patent Application Publication No. 2003/0200104 to Heming et al. ("the Heming Application"). Yet, the Heming Application does not address valuation for new or emerging technologies or the problems described above with determining the licensing market.

In the current IP licensing market, litigation is the only means of recourse an IP owner may have against infringers or parties refusing to accept or pay for licenses. Because of this, the current IP licensing market often is reactive by focusing primarily on parties that already are infringing certain IP rights. For instance, an IP owner may discover that a competitor is making or using a certain patented device. Should licensing negotiations not prove successful (or not even be an option), the IP owner may have to prevail in a patent infringement lawsuit before the IP owner is rightfully compensated for the infringer's use of the patented device. Patent infringement lawsuits often are extremely expensive, sometimes costing multiple millions of dollars, and resolution is seldom quick. In other words, an IP owner may have to spend millions of dollars and wait several years before prevailing in a patent infringement action and finally realizing any financial gain from the IP.

A couple alternatives to the traditional IP licensing market exist, such as patent pools and patent license exchange companies. Patent pools, for instance, collect IP that typically is related to a standard and license it non-exclusively under common terms. Patent license exchange companies, on the other hand, raise money (sometimes as much as hundreds of millions of dollars) to purchase patents and license or enforce them against infringers. While patent pools and patent license exchange companies tend to expedite the traditional IP licensing process, they often do so at the expense of the value of the IP. For example, a patent pool may not receive the maximum value for each patent among the pool. In order to maintain marketability for the entire pool, certain patents within the pool may be considerably discounted or licensed for far less than the market may provide if the discounted patents were licensed individually.

Convenient marketplaces exist for buying and selling (or trading) other types of property rights and assets, such as stocks and other securities, commodities, futures, and even environmental emissions permits. For example, various exchanges, such as the New York Stock Exchange ("NYSE"), actively trade stocks and securities. Other exchanges, such as the Chicago Board of Trade ("CBOT") actively trade commodities and futures. And while most trading activity today is performed electronically, some exchanges such as the National Association of Securities Dealers Automated Quotations ("NASDAQ") are entirely traded electronically without utilizing a centralized trading floor. These trading exchanges allow for assets such as stocks and securities to be quickly and easily traded, both upon the initial public offering ("IPO") and during subsequent day-to-day transactions. As a result, owners of such assets have an immediate market for trading and do not have to spend months seeking out buyers and negotiating prices.

Presently, there is no convenient, centralized marketplace for trading IP rights. Accordingly, there is a need for an IP licensing marketplace and a method of trading IP rights in an expeditious manner that maximizes the value of the IP.

SUMMARY OF THE INVENTION

In accordance with one aspect of the present invention, an intellectual property trading exchange is disclosed for facilitating the trading of intellectual property rights. The exchange includes at least one intellectual property license contract relating to intellectual property rights and a forum configured to allow a plurality of participants to trade the license contract. The plurality of participants includes at least one seller having the license contract and desiring to trade the license contract. The plurality of participants also includes at least one buyer desiring to obtain the license contract.

In accordance with another aspect of the present invention, a method is disclosed for trading at least one license contract relating to intellectual property rights by a seller of the license contract to at least one buyer through an intellectual property exchange. The method includes the steps of: the seller listing the license contract on the intellectual property exchange, the buyer purchasing the license contract through the intellectual property exchange, and the intellectual property exchange clearing the purchase by the buyer of the license contract.

DETAILED DESCRIPTION OF THE INVENTION

Figure 1:
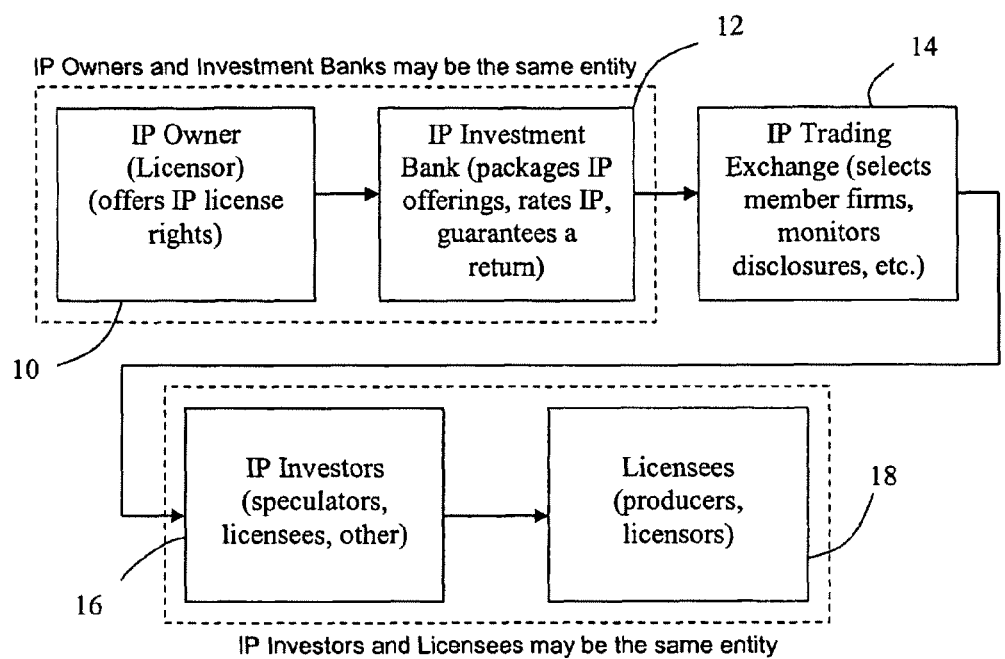
FIG. 1 shows the steps of an initial offering of licenses on an embodiment of an intellectual property trading exchange of the present invention.

The current market for intellectual property ("IP") and sophistication of current exchanges provide an opportunity to develop efficiencies in the IP marketplace and maximize IP valuation through an IP trading exchange. An IP trading exchange may be used for licensing or selling all types of IP, including patents, copyrights, trademarks, trade dress, and trade secrets. Moreover, in one embodiment of the present invention, the IP may include issued patents, registered copyrights, registered trademarks, or any other granted or registered IP. In another embodiment of the present invention, the IP may include pending patent applications, pending trademark applications, or any other pending IP application or registration.

An IP trading exchange offers a forum in which IP owners, licensees, or financial investors or speculators may buy or sell IP rights through licenses and/or related futures contracts. For example, in accordance with one embodiment of the present invention, an IP trading exchange may be used to buy or sell IP rights through licenses, which may then be used to practice the invention or legitimize current operations that may be infringing. In accordance with another embodiment of the present invention, an IP trading exchange may be used to buy or sell speculative IP rights through futures contracts, the goal of which is to earn appreciation by re-selling for a higher price at some time in the future.

Key Elements of an IP Trading Exchange

Following are descriptions of key elements of an IP trading exchange in accordance with one or more embodiments of the present invention. An IP trading exchange may have some or all of these elements, as well as any additional elements necessary for the setup, execution, and daily operation of an IP trading exchange.

Intellectual Property. Intellectual property ("IP") includes patents, copyrights, trademarks, trade dress, trade secrets, and any other intangible ideas or expressions. IP is a form of legal entitlement, which allows its owner or holder to control the use, manufacture, or sale of the IP. For example, a patent allows the owner or holder to exclude others from practicing an invention. Manufacturers and other potential holders gain the right to practice an excluded invention by licensing or purchasing the rights from a patent owner. In an IP trading exchange, certain IP is accepted for listing on the exchange, as described below.

IP Owner. The IP owner (licensor) provides licensing and sub-licensing rights to licensees in exchange for royalties or other compensation as stipulated by the license agreement. In accordance with one embodiment of the present invention, an IP owner licenses the IP to an investment bank in exchange for a cash payment. In accordance with another embodiment of the present invention, an IP owner performs the listing and underwriting of IF license contracts itself and without the assistance of an IP investment bank. The IP owner may include multiple individuals and/or entities. For instance, the IP owner may include all of the owners of various intellectual property rights relating to a specific product or industry.

IP Investment Bank. In accordance with one or more embodiments of the present invention, investment banks receive the IP rights from the IP owner and package them for listing or inclusion on the IP trading exchange. Specifically, an investment bank rates, insures, and values the IP, as described below. Additionally, the investment bank may perform other functions such as underwriting the licensing transaction. Further, the investment bank may certify that IP license contracts comply with the regulations of trading and the requirements of listing on the IP trading exchange. The investment bank may then list the IP on the IP trading exchange and sub-license the IP to perspective buyers. In another embodiment of the present invention, the IP investment bank may have the right to enforce the IP should an infringer not purchase a license from the IP trading exchange. The IP owner may choose to join the IP investment bank in any enforcement proceedings if desired or if necessary.

IP Trading Exchange. The IP trading exchange monitors disclosures, guarantees transactions, and clears transactions similar to today's commodities and futures exchanges, in addition to other functions performed by today's exchanges. The IP trading exchange may monitor and/or enforce regulations relating to trading, including regulations created by the exchange as well as governmental regulations. Further, the IP trading exchange may monitor and/or enforce requirements for listing IP license contracts on the exchange. After the initial offering, IP pricing is achieved by continuous or day-to-day trading, as described below. The IP trading exchange keeps track of pricing information and provides pricing information on a realtime basis. Pricing information may be provided in any print (e.g., newspaper, facsimile) or electronic (e.g., ticker, RSS feed, webstream, e-mail, internet webpage) medium. Additionally, the IP trading exchange may provide pricing information in the form of industrial averages or indices, which may be based on average pricing information for license contracts relating to various technologies, industries, and/or companies.

IP Investors. IP investors (which may include speculators, market makers, and arbitrageurs) add liquidity to the market. IP investors purchase IP licensing and/or futures contracts with the goal of re-selling the contracts at higher prices sometime in the future. In some embodiments of the present invention, the IP investors may act on behalf of licensors or licensees.

Licensees. Licensees are the ultimate buyers of the IP rights and consumers of the IP trading exchange. Licensees purchase LP licensing in order to practice the invention. In some cases, licensees purchase IP licensing in order to legitimize current operations that may be infringing. In some embodiments of the present invention, the licensee also may serve as the IP investor.

Initial Offering of IP Rights

For purposes of illustration only, an IP trading exchange may be thought of as a hybrid of today's stock and commodities exchanges. For example, the initial offering of rights to a particular IP may be modeled after a stock initial public offering ("IPO") on a traditional stock exchange.

In the first step of an IP initial offering, the IP owner identifies IP that it desires to license. It then solicits bids from IP investment banks to perform the listing and underwriting process. Alternatively, the IP owner may perform the listing and underwriting process itself.

If the IP owner utilizes an IP investment bank, then IP investment banks bid on the listing and underwriting process, and the IP owner selects one of the investment banks, typically the lowest bidder, to carry the process forward. Investment banks typically work out a fee structure for the listing and underwriting process, which may be fixed fees, success or percentage fees based on the success of the IP initial offering, or a combination of both fixed and success fees.

Next, the selected IP investment bank may begin the due diligence phase of the listing process. As described below, the due diligence phase includes: packaging the IP for listing; performing legal analysis of the strength and ownership of the IP; performing market analysis of the products and/or parties which may infringe the IP and require or benefit from licensees to the IP; performing valuation analyses; and marketing the IP. The due diligence phase may be conducted by the IP owner and/or the IP investment bank. Alternatively, the due diligence phase may be contracted out to lawyers, economists, marketing firms, or other specialists and third parties.

By packaging the IP, the IP owner (or, for example, marketing firms) determine which of the relevant IP should be included in the listing. For instance, an IP owner may only have one patent, and only that patent would be listed. But in instances where the IP owner has numerous IP or multiple related IP, determining which IP should be included in a single listing may require careful consideration. For example, IP may be grouped by product or product group, such as all of the patents and trademarks related to a particular car or line of cars. As another example, IP may be grouped by patent families, such as a parent patent and all patents relating or based on the parent.

The legal analysis of the IP is to determine the strength, or at least an opinion of the strength, of the IP. For instance, with patents, the prior art may be assessed and opinions may be made concerning any possible invalidity issues based on the prior art. Additionally, claim charts may be made and the claims may be construed to determine the patent's scope of coverage. It also may be important to ensure that certain formalities have been followed, such as proper recordation of any assignments, perfection of claims of priority, and/or payment of any annuities or maintenance fees. With, for example, trade secrets, the extent to which the trade secrets have been kept confidential may be assessed, including whether non-disclosure agreements have been used and the extent to which the trade secret has been disclosed, taught, or demonstrated. As another example, with trademarks, a trademark search and/or consumer surveys may be conducted to determine the brand recognition or strength of the mark. Also, it may be important to determine whether formalities have been followed, such as timely filing of statements of use and/or payment of any annuities or maintenance fees.

Valuation of the IP may involve the consideration of numerous factors, such as the strength of the IP, the ability to use or the availability of substitute or competing technologies, the market need for the technology, and/or the market size and number of parties that may be benefit from or require licensing. Also, valuation may depend on the quantity of IP packaged together in the listing. Valuation may require the consideration of economists and lawyers. Additionally, third party ratings or assessments of IP may be helpful in determining the value of the IP.

Upon completion of the due diligence phase, the IP investment bank determines whether or not the IP should be listed on the IP trading exchange based on the due diligence review. This determination is based on the IP investment bank's own underwriting criteria. As with all risks, some investment banks are more conservative than others and may have different standards in evaluating the above factors of the due diligence review. Should the IP investment bank accept the IP for listing on the IP trading exchange, the IP investment bank assigns a listing price and provides an estimate of the cash from listing the IP to the IP owner.

If the listing price is satisfactory, the IP owner may grant the IP investment bank an exclusive license for the intellectual property with the right to sub-license on a limited (e.g., quantity) non-exclusive basis. In accordance with one embodiment of the present invention, the IP owner may retain a non-exclusive right to practice the IP at no cost or at a reduced cost. In accordance with another embodiment of the present invention, the IP investment bank may obtain an exclusive license in order to have the ability to enforce the IP against infringers. The IP owner may choose to join any enforcement proceedings if desired or if necessary.

Upon receiving the exclusive license, the IP investment bank may prepare an IP prospectus and/or other marketing materials to attract potential licensees, investors, and/or speculators. These materials likely include information obtained from the due diligence review. For instance, the materials may include: a listing of the IP included in the non-exclusive license; legal analysis of the strength of the IP; the terms of the non-exclusive license contract including the number of units that can be produced and the duration of the contract; the nature of the enforcement actions that may be taken against infringers; portions of the valuation analysis; when and under what terms additional licenses may be made available (e.g., if license contracts trade for more than a certain value for more than a specific number of continuous trading days, a new release of licenses will be made available).

Next, the IP owner and/or IP investment bank prepares for the initial offering of the IP rights. As with stock IPOs, the IP owner and/or IP investment bank seeks to list certain IP license contracts on the IP trading exchange. The initial offering may be based on a certain quantity of IP license contracts, a certain duration for the IP license contracts, or a combination of both quantity and duration.

Then, the IP trading exchange allows the IP license contracts to be listed on the exchange. The IP license contracts may be listed by members or member firms of the exchange, which may include IP investment banks or other investors. Alternatively, the IP license contracts may be listed by the IP owner.

The IP trading exchange carries out duties which may be similar to current stock exchanges. For example, the IP trading exchange monitors disclosures, guarantees transactions, and clears transactions. The IP trading exchange may monitor and/or enforce any trading regulations, including regulations enacted by the exchange and/or any governmental regulations. Alternatively, this function in whole or in part also may be carried out by IP investment banks.

Additionally, the IP trading exchange may monitor and/or enforce any requirements of listing on the exchange. Alternatively, monitoring and/or enforcing of any listing requirements may be carried out, in whole or in part, by IP investment banks. Listing requirements, which may be created by the exchange, may include considerations such as whether the intellectual property rights have been litigated and, if so, the extent to which they have been litigated; whether competent prior art searches have been conducted; and/or whether any opinions of counsel have been made. Based on listing requirements such as the above, the IP license contracts may be listed separately on the exchange under different types or classes.

For example, IP license contracts relating to intellectual property that has been litigated may be classified separately from those contracts relating to intellectual property that has not been litigated. IP contracts which relate to intellectual property that has been litigated may be further classified depending on the extent of litigation. For example, IP contracts relating to intellectual property that has been litigated in district courts and found valid and enforceable may be placed in one class, while IP contracts relating to intellectual property that has been litigated in the Federal Circuit or the Supreme Court may be placed in different classes. Additionally, IP license contracts relating to intellectual property where opinions of counsel have been made may be placed in a class separate from those IP license contracts relating to intellectual property where opinions of counsel have not been made. One or more of the above requirements and/or considerations may be used in listing the IP license contracts on the exchange.

Investors, licensees, and licensors may purchase the IP license contracts from the IP trading exchange. Investors purchase IP license contracts with the goal of seeking appreciation or re-selling at a higher price at some time in the future. In this sense, the IP license contracts are similar to a futures contract. Licensees, on the other hand, purchase the contracts in order to practice the IP or legitimize infringing uses of the IP. In this sense, licensees take delivery of the actual license. Unused IP license contracts may be re-listed at a later time on the IP trading exchange upon an audit of current operations indicating that the IP is no longer being practiced or is within levels considered acceptable by the license. Further, if future operations require a license and the licensee has sold the license through re-listing, then the licensee will need to acquire a new license from the IP trading exchange in order to resume operations.

In accordance with one embodiment of the present invention, the listing IP investment bank may initiate patent infringement actions and other enforcement proceedings against infringers who refuse to purchase licenses through the IP trading exchange. The IP owner may choose to join any enforcement proceedings if desired or if necessary. Excess proceeds from infringement actions may be used by the investment bank to purchase IP license contracts from the IP trading exchange, thereby increasing the price of the contracts and raising the value of the IP.

Day-to-Day Transactions of IP Rights

For purposes of illustration only, an IP trading exchange may be thought of as a hybrid of today's stock and commodities exchanges. For example, day-to-day transactions of rights to a certain listed IP may be modeled after a traditional commodities exchange where contracts are traded on a daily basis.

As part of the first step of a typical day-to-day transaction of IP rights, the owner or seller of at least one IP license contract lists the contract and an asking or specified price on the IP trading exchange. In situations where multiple contracts are owned, the IP license holder may list multiple if not all of the license contracts on the exchange. The IP license holder may perform the listing itself or it may retain an exchange member to perform the listing. The IP license holder may be an investor or speculator who is re-selling the license contract for a higher price. Alternatively, the IP license holder may be a licensee who no longer needs the license, as described below, or is selling excess license contracts.

Through the IP trading exchange, buyers determine whether or not demand is sufficient to buy the license contract for the IP license holder's specified price as listed on the exchange. If buyers are unwilling to pay the specified price, then the seller retains the license contract until such time when the price becomes more attractive in the market. Alternatively, the seller may lower the asking price to attract a buyer, which may be necessary to sell the license contract if expiration is imminent.

If buyers are willing to pay the specified price, then the sale moves forward towards closing. Typically, an exchange member purchases the license contract on behalf of the buyer at the specified price, and the IP trading exchange clears the transaction. In most any situation, the IP trading exchange monitors any disclosures and guarantees and clears the transaction.

With investors, the buyer may hold the license contract until such time that the price becomes attractive for the buyer to sell the contract. If expiration is imminent, the buyer may be forced to sell the license contract, perhaps even at a discounted price.

In the situation of a licensee or licensor, the buyer may hold the contract beyond expiry and take delivery of the actual license. For instance, a licensee may require the actual license in order to practice the IP or legitimize current operations that may be infringing. Typically, the actual license is delivered by the specialist holding the license.

Where delivery of the actual license has occurred, the holder of the license may only re-list the license upon an audit of current operations indicating that the IP is no longer being practiced or is within levels considered acceptable by the license. Further, if future operations require a license and the licensee has sold the license through re-listing, then the licensee will need to acquire a new license from the IP trading exchange in order to resume operations.

While contracts are listed on the IP trading exchange, the IP investment bank that initially listed the transaction or its agents may encourage potential licensees to purchase licenses from the exchange. Conducting a licensing and/or marketing campaign often fosters interest in the licenses, which may generate activity in the market and ultimately raise the exchange prices and IP value.

Depending on trading activity, it may be necessary to release additional license contracts. For instance, if license contracts trade for more than a certain value for more than a specific number of continuous trading days, a new release of licenses may be warranted. The initial offering stipulates the conditions under which additional licenses may be released. As with the initial offering, the release of additional licenses may be based on a certain quantity of IP license contracts, a certain duration for the IP license contracts, or a combination of both quantity and duration. For example, the initial offering may stipulate that a release of ten new licenses is warranted when trading of the existing licenses exceeds $1,000,000 for more than a thirty-day trading period. The second offering of new licenses may stipulate the conditions under which yet another release of new licenses may be warranted. Additional licenses are released in a manner similar to the initial release described above. The new licenses are then bought and sold as described above with respect to day-to-day transactions.

In accordance with one embodiment of the present invention, the investment bank or its agents may take legal action to require a potential licensee to purchase a license, such as where potential licensee may be infringing the IP and refuses to purchase a license. The IP owner may choose to join any enforcement proceedings if desired or if necessary. Excess funds generated from any resolution of legal action may be used to purchase licenses from the IP trading exchange, which mitigates the high cost of litigation and, at the same time, increases the price of the contracts and value of the IP.

DETAILED DESCRIPTION OF THE PREFERRED EMBODIMENT

The present invention will now be described more fully with reference to the Figures in which the preferred embodiment of the present invention is shown. The subject matter of this disclosure may, however, be embodied in many different forms and should not be construed as being limited to the embodiment set forth herein.

Referring now to the drawings, wherein like reference numerals designate identical or corresponding parts throughout the several views, FIG. 1 shows the steps of an initial offering of licenses on an IP trading exchange according to a presently preferred embodiment of the present invention.

Initially, the IP Owner 10 identifies IP that it desires to license. The IP may include patents, copyrights, trademarks, trade dress, and trade secrets. Moreover, the IP may include issued patents, registered copyrights, registered trademarks, or any other granted or registered IP. Additionally, the IP may include pending patent applications, pending trademark applications, or any other pending IP application or registration. The IP Owner 10 then solicits bids from IP Investment Banks 12 to perform the listing and underwriting process.

The IP Investment Banks 12 then bid on the listing and underwriting process, and the IP Owner 10 selects one of the banks, typically the lowest bidder, to carry the process forward. Investment Banks 12 typically work out a fee structure for the listing and underwriting process, which may be fixed fees, success or percentage fees based on the success of the IP initial offering, or a combination of both fixed and success fees.

The selected IP Investment Bank 12 begins the due diligence phase of the listing process. The due diligence phase may include: packaging the IP for listing; performing legal analysis of the strength and ownership of the IP; performing market analysis of the products and/or parties which may infringe the IP and require or benefit from licensees to the IP; performing valuation analyses; and marketing the IP. The due diligence phase may be conducted by the LP Owner 10 or contracted out to lawyers, economists, marketing firms, or other specialists and third parties.

Upon completion of the due diligence phase, the IP Investment Bank 12 determines whether or not the IP should be listed on the IP Trading Exchange 14 based on the due diligence review. This determination is based on the IP Investment Bank's own underwriting criteria. As with all risks, some banks are more conservative than others and may have different standards in evaluating the above factors of the due diligence review. Should the IP Investment Bank 12 accept the IP for listing on the IP Trading Exchange 14, the IP Investment Bank 12 assigns a listing price and provides an estimate of the cash from listing the IP to the IP Owner 10.

If the listing price is satisfactory, the IP Owner 10 may grant the IP Investment Bank 12 an exclusive license for the intellectual property with the right to sub-license on a limited (e.g., quantity) non-exclusive basis. Additionally, the IP Owner 10 may retain a non-exclusive right to practice the IP at no cost or at a reduced cost. Further, the IP Investment Bank 12 may obtain an exclusive license in order to have the ability to enforce the IP against infringers.

Upon receiving the exclusive license, the IP Investment Bank 12 may prepare an IP prospectus and/or other marketing materials to attract potential licensees, investors, and/or speculators. These materials likely include information obtained from the due diligence review. For instance, the materials may include: a listing of the IP included in the non-exclusive license; legal analysis of the strength of the IP; the terms of the non-exclusive license contract including the number of units that can be produced and the duration of the contract; the nature of the enforcement actions that may be taken against infringers; portions of the valuation analysis; when and under what terms additional licenses may be made available (e.g., if license contracts trade for more than a certain value for more than a specific number of continuous trading days, a new release of licenses will be made available).

Next, the IP Owner 10 and/or the Investment Bank 12 prepares for the initial offering of the IP rights. As with stock IPOs, the Investment Bank 12 seeks to list certain IP license contracts on the IP Trading Exchange 14. The listing of IP license contracts may be based on quantity, duration, or a combination of both.

Then, the IP Trading Exchange 14 allows member firms to list the IP license contracts on the exchange. The IP Trading Exchange 14 carries out duties similar to current stock exchanges. For example, the IP Trading Exchange 14 monitors disclosures, guarantees transactions, and clears transactions.

Speculators and Investors 16 and/or Licensees 18 may purchase the IP license contracts from the IP Trading Exchange 14. Speculators and Investors 16 purchase IP license contracts with the goal of seeking appreciation or re-selling at a higher price at some time in the future. In this sense, the IP license contracts are similar to a futures contract. Licensees 18, on the other hand, purchase the contracts in order to practice the IP or legitimize infringing uses of the IP. In this sense, Licensees 18 take delivery of the actual license. Unused IP license contracts may be re-listed at a later time on the IP Trading Exchange 14 upon an audit of current operations indicating that the IP is no longer being practiced or is within levels considered acceptable by the license. Further, if future operations require a license and the Licensee 18 has sold the license through re-listing, then the Licensee 18 will need to acquire a new license from the IP Trading Exchange 14 in order to resume operations.

The listing IP Investment Bank 12 may initiate patent infringement actions and other enforcement proceedings against infringers who refuse to purchase licenses through the IP Trading Exchange 14. The IP Owner 10 may choose to join any enforcement proceedings if desired or if necessary. Excess proceeds from infringement actions may be used by the Investment Bank 12 to purchase IP license contracts from the IP Trading Exchange 14, thereby increasing the price of the contracts and raising the value of the IP.

Figure 2:
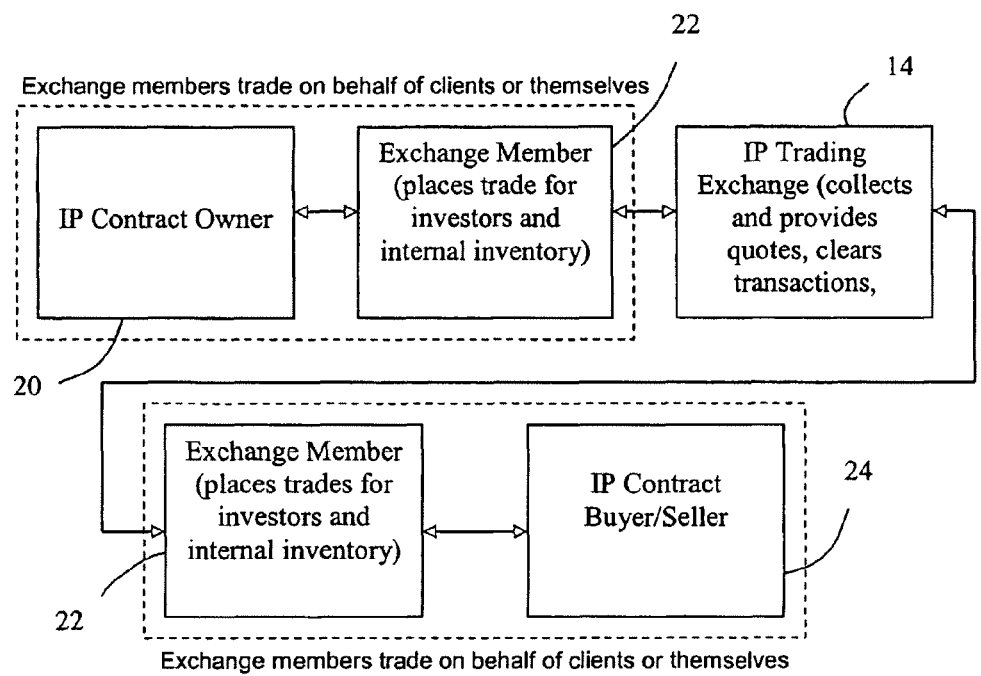
FIG. 2 shows typical day-to-day transactions on an embodiment of an intellectual property trading exchange of the present invention.

FIG. 2 shows typical day-to-day transactions on an IP trading exchange according to a presently preferred embodiment of the present invention.

As part of the first step of a typical day-to-day transaction of IP rights, the IP Contract Owner 20 of at least one IP license contract lists the contract and an asking or specified price on the IP Trading Exchange 14. In situations where multiple contracts are owned, the IP Contract Owner 20 may list multiple if not all of the license contracts on the exchange. The IP Contract Owner 20 may perform the listing itself or it may retain an Exchange Member 22 to perform the listing. The IP Contract Owner 20 may be an investor or speculator who is re-selling the license contract for a higher price. Alternatively, the IP Contract Owner 20 may be a licensee who no longer needs the license, as described below, or is selling excess license contracts.

Through the IP Trading Exchange 14, buyers determine whether or not demand is sufficient to buy the license contract for the IP Contract Owner's specified price as listed on the exchange. If buyers are unwilling to pay the specified price, then the IP Contract Owner 20 retains the license contract until such time when the price becomes more attractive in the market. Alternatively, the IP Contract Owner 20 may lower the asking price to attract a buyer, which may be necessary to sell the license contract if expiration is imminent.

If a Buyer 24 is willing to pay the specified price, then the sale moves forward towards closing. Typically, an Exchange Member 22 purchases the license contract on behalf of the Buyer 24 at the specified price, and the IP Trading Exchange 14 clears the transaction. In most any situation, the IP Trading Exchange 14 monitors any disclosures and guarantees and clears the transaction.

When the Buyer 24 is an investor or speculator, the Buyer 24 may hold the license contract until such time that the price becomes attractive for the Buyer 24 to sell the contract. If expiration is imminent, the Buyer 24 may be forced to sell the license contract, perhaps even at a discounted price.

When the Buyer 24 is a licensee, the Buyer 24 may hold the contract beyond expiry and take delivery of the actual license. For instance, a licensee may require the actual license in order to practice the IP or legitimize current operations that may be infringing. Typically, the actual license is delivered by the specialist holding the license.

Where delivery of the actual license has occurred, the holder of the license may only re-list the license upon an audit of current operations indicating that the IP is no longer being practiced or is within levels considered acceptable by the license. Further, if future operations require a license and the licensee has sold the license through re-listing, then the licensee will need to acquire a new license from the IP Trading Exchange 14 in order to resume operations.

While contracts are listed on the IP Trading Exchange 14, the IP investment bank that initially listed the transaction or its agents may encourage potential licensees to purchase licenses from the exchange. Conducting a licensing and/or marketing campaign often fosters interest in the licenses, which may generate activity in the market and ultimately raise the exchange prices and IP value.

Depending on trading activity, it may be necessary to release additional license contracts. For instance, if license contracts trade for more than a certain value for more than a specific number of continuous trading days, a new release of licenses may be warranted. The initial offering stipulates the conditions under which additional licenses may be released. For example, the initial offering may stipulate that a release of ten new licenses is warranted when trading of the existing licenses exceeds $1,000,000 for more than a thirty-day trading period. The second offering of new licenses may stipulate the conditions under which yet another release of new licenses may be warranted. Additional licenses are released in a manner similar to the initial release described above. The new licenses are then bought and sold as described above with respect to day-to-day transactions.

Additionally, the investment bank or its agents may take legal action to require a potential licensee to purchase a license, such as where potential licensee may be infringing the IP and refuses to purchase a license. The IP owner may join any enforcement proceedings if desired or if necessary. Excess funds generated from any resolution of legal action may be used to purchase licenses from the IP trading exchange, which mitigates the high cost of litigation and, at the same time, increases the price of the contracts and value of the IP.

Many changes and modifications will occur to those skilled in the art upon studying this description. All such changes and modifications which are within the spirit of the invention are intended to be included within the scope of the claims.

We claim:

1. An electronic intellectual property trading exchange system for facilitating the trading of intellectual property rights, comprising:
    at least one electronic storage device configured to store at least one unitized intellectual property license contract, the at least one unitized license contract relating to intellectual property rights, said at least one unitized license contract comprising the right to practice the intellectual property for a predetermined quantity of instances; and
    an electronically accessible forum, the electronically accessible forum defining at least one regulation of trading and at least one requirement of listing on the electronic exchange, the electronically-accessible forum configured to list the at least one unitized license contract for trading between a plurality of participants, the electronically-accessible forum further configured to facilitate trading at least one additional unitized license contract based on demand of the plurality of participants, including buyers and sellers.

2. The electronic intellectual property trading exchange of claim 1 wherein the intellectual property rights include at least one of, issued patents, registered copyrights, registered trademarks and any other granted or registered intellectual property.

3. The electronic intellectual property trading exchange of claim 1 wherein the intellectual property rights include at least one of pending patent applications, pending trademark applications and any other pending intellectual property application or registration.

4. The electronic intellectual property trading exchange of claim 1 wherein the plurality of participants further comprises at least one investment bank, the at least one investment bank configured to underwrite the trading of the at least one unitized license contract.

5. The electronic intellectual property trading exchange of claim 4 wherein the at least one investment bank is configured to purchase for resale the at least one unitized license contract.

6. The electronic intellectual property trading exchange of claim 4 wherein the at least one investment bank is configured to rate the intellectual property rights, wherein the rating is configured to be indicative of the strength of the intellectual property rights based on a legal analysis of the rights.

7. The electronic intellectual property trading exchange of claim 4 wherein the at least one investment bank is configured to insure the intellectual property rights.

8. The electronic intellectual property trading exchange of claim 4 wherein the at least one investment bank is configured to value the intellectual property rights, wherein the valuation is based on a marketability analysis of the intellectual property rights.

9. The electronic intellectual property trading exchange of claim 4 wherein the at least one investment bank is configured to enforce the intellectual property rights against an infringer and/or a party refusing to purchase the at least one unitized license contract.

10. An electronically implemented method for trading at least one unitized license contract relating to intellectual property rights by at least one seller to at least one buyer through an electronically-accessible intellectual property exchange, the method comprising:

storing in a electronic storage device at least one regulation of trading and at least one requirement of listing on the electronic exchange;

storing in the electronic storage device information describing a listing of the at least one unitized license contract, including rights to practice the intellectual property for a predetermined quantity of instances;

storing in the electronic storage device information describing the at least one seller having the at least one unitized license contract relating to the intellectual property rights, the at least one seller desiring to trade the at least one unitized license contract;

storing in the electronic storage device information describing the at least one buyer desiring to obtain the at least one unitized license contract through the electronically-accessible intellectual property exchange;

processing in an electronic device the clearing of the trade between the seller and the buyer of the at least one unitized license contract; and storing in the electronic storage device information describing at least one additional listing of the at least one unitized license contract.

11. The electronically-implemented method of claim 10 wherein the intellectual property rights include at least one of: issued patents, registered copyrights, registered trademarks and/or any other granted or registered intellectual property.

12. The electronically-implemented method of claim 10 wherein the intellectual property rights include at least one of: pending patent applications, pending trademark applications and/or any other pending intellectual property application or registration.

13. The electronically-implemented method of claim 10 further comprising the step of storing in the electronic storage device information describing at least one investment bank, the at least one investment bank configured to underwrite the trading of the at least one unitized license contract.

14. The electronically-implemented method of claim 13 wherein the at least one investment bank is configured to purchase for resale the at least one unitized license contract.

15. The electronically-implemented method of claim 13 wherein the at least one investment bank is configured to rate the intellectual property rights, the rating indicative of the strength of the intellectual property rights based on a legal analysis of the rights.

16. The electronically-implemented method of claim 13 wherein the at least one investment bank is configured to insure the intellectual property rights.

17. The electronically-implemented method of claim 13 wherein the at least one investment bank is configured to value the intellectual property rights, the valuation based on a marketability analysis of the intellectual property rights.

18. The electronically-implemented method of claim 13 wherein the at least one investment bank is configured to enforce the intellectual property rights against an infringer and/or a party refusing to purchase the at least one unitized license contract.

19. An electronically-implemented method for trading at least one unitized license contract relating to intellectual property rights by at least one seller to at least one buyer through an electronically-accessible intellectual property exchange, the method comprising:

storing in an electronic storage device information describing the at least one seller having the at least one unitized license contract relating to the intellectual property rights;

storing in the electronic storage device information describing the at least one unitized license contract, including rights to practice the intellectual property for a predetermined quantity of instances;

storing in the electronic storage device information describing the at least one buyer obtaining the at least one unitized license contract through the electronically-accessible intellectual property exchange;

processing in an electronic device the clearing of the trade between the seller and the buyer of the at least one unitized license contract;

storing in the electronic storage device information describing the at least one buyer trading the at least one unitized license contract through the electronically-accessible intellectual property exchange; and processing in an electronic device the clearing of the trade by the buyer of the at least one unitized license contract.

20. The electronically implemented method of claim 19 wherein the intellectual property rights include at least one of: issued patents, registered copyrights, registered trademarks and/or any other granted or registered intellectual property.

21. The electronically-implemented method of claim 19 wherein the intellectual property rights include at lest one of: pending patent applications, pending trademark applications and/or any other pending intellectual property application or registration.

22. The electronically-implemented method of claim 19 further comprising the step of storing in the electronic storage device information describing at least one investment bank, the at least one investment bank configured to underwrite the trading of the at least one unitized license contract.

23. The electronically-implemented method of claim 22 wherein the at least one investment bank is configured to purchase for resale the at least one unitized license contract.

24. The electronically-implemented method of claim 22 wherein the at least one investment bank is configured to rate the intellectual property rights, the rating indicative of the strength of the intellectual property rights based on a legal analysis of the rights.

25. The electronically-implemented method of claim 22 wherein the at least one investment bank is configured to insure the intellectual property rights during the trading transaction.

26. The electronically-implemented method of claim 22 wherein the at least one investment bank is configured to value the intellectual property rights, the valuation based on a marketability analysis of the intellectual property rights.

27. The electronically-implemented method of claim 22 wherein the at least one investment bank is configured to enforce the intellectual property rights against an infringer and/or a party refusing to purchase the at least one unitized license contract.

* * * * *